US012605860B2

(12) United States Patent
Lin

(10) Patent No.: US 12,605,860 B2
(45) Date of Patent: Apr. 21, 2026

(54) CUTTING AND ATTACHING SYSTEM FOR SCREEN PROTECTOR HAVING HIGH HARDNESS

(71) Applicant: Chia-Ching Lin, Taipei City (TW)

(72) Inventor: Chia-Ching Lin, Taipei City (TW)

( * ) Notice: Subject to any disclaimer, the term of this patent is extended or adjusted under 35 U.S.C. 154(b) by 79 days.

(21) Appl. No.: 18/822,699

(22) Filed: Sep. 3, 2024

(65) Prior Publication Data

US 2025/0222616 A1 Jul. 10, 2025

Related U.S. Application Data

(60) Provisional application No. 63/617,876, filed on Jan. 5, 2024.

(51) Int. Cl.
*B26F 1/38* (2006.01)
*B26D 5/32* (2006.01)
*B26D 5/00* (2006.01)

(52) U.S. Cl.
CPC .............. *B26F 1/3813* (2013.01); *B26D 5/32* (2013.01); *B26D 2005/002* (2013.01)

(58) Field of Classification Search
CPC ........... B26F 1/3813; B26D 5/32; B26D 7/27; B26D 1/0006; B32B 38/0004; B32B 33/02; B65B 61/005
See application file for complete search history.

(56) References Cited

U.S. PATENT DOCUMENTS

2012/0110868 A1* 5/2012 Abbondanzio ......... B29C 63/02 33/645
2024/0100817 A1 3/2024 O'Donnell

FOREIGN PATENT DOCUMENTS

CN 104325725 A 2/2015
CN 204196395 U 3/2015
CN 103448943 B 5/2015
CN 208880793 U * 5/2019 ............... B26D 1/10
CN 112123384 A 12/2020
WO WO-2008092140 A2 * 7/2008 ............... B26D 5/34

* cited by examiner

*Primary Examiner* — Daniel McNally
(74) *Attorney, Agent, or Firm* — Li & Cai Intellectual Property (USA) Office

(57) ABSTRACT

A cutting and attaching system for a screen protector having a high hardness is provided, and includes a cutting apparatus, a universal sheet having a hardness of at least 5H, and a film applicator. The cutting apparatus can perform a cutting process to the universal sheet through a cutter thereof according to the film applicator and a mobile apparatus, thereby forming a screen protector that is suitable to be applied to the film applicator and the mobile apparatus.

10 Claims, 19 Drawing Sheets

CUTTING AND ATTACHING SYSTEM FOR SCREEN PROTECTOR HAVING HIGH HARDNESS

CROSS-REFERENCE TO RELATED PATENT APPLICATION

This application claims the benefit of priority to the U.S. Provisional Patent Application Ser. No. 63/617,876, filed on Jan. 5, 2024, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a screen protector and a cutter, and more particularly to a cutting and attaching system that is provided for a screen protector having a high hardness and that is suitable to cut a universal sheet having at least 5H hardness.

BACKGROUND OF THE DISCLOSURE

A conventional cutter is provided only for cutting a soft screen protector having a hardness less than 3H, thereby enabling the soft screen protector to form a shape that fits on any mobile apparatus. However, a hardened screen protector having a hardness greater than or equal to 5H is difficult to be cut for meeting shape or quality of a mobile apparatus through a conventional cutting manner (e.g., the hardened screen protector can easily have burrs or a scratchy structure after being cut). Accordingly, for manufacturers that provide screen protectors to attach onto any mobile apparatus, the hardened screen protectors can only be inventoried in various shapes and sizes in order to fit different mobile apparatuses, which not only greatly increases inventory costs, but also makes it difficult to meet screen protector requirements of less common brands of mobile apparatuses.

SUMMARY OF THE DISCLOSURE

In response to the above-referenced technical inadequacies, the present disclosure provides a cutting and attaching system for a screen protector having a high hardness for effectively improving on the issues associated with conventional cutting manners.

In order to solve the above-mentioned problems, one of the technical aspects adopted by the present disclosure is to provide a cutting and attaching system for a screen protector having a high hardness, which includes a cutting apparatus, a universal sheet, and a film applicator. The cutting apparatus includes a carrying machine, a displacement mechanism, a processing module, and a cutter. The displacement mechanism is assembled to the carrying machine and is movable relative to the carrying machine. The processing module is assembled to the carrying machine. The processing module is electrically coupled to the displacement mechanism and is configured to move the displacement mechanism along a hole cutting path and a screen cutting path that is different from the hole cutting path. The screen cutting path corresponds to a contour of a screen of a mobile apparatus. The cutter is assembled to the displacement mechanism. The cutter defines a transversal reference plane and a longitudinal plane that is perpendicular to transversal reference plane, and the transversal reference plane is perpendicular to a longitudinal direction of the cutter. The cutter includes a supporting segment and a cutting segment that is connected to the supporting segment. The cutting segment has a first lateral surface, a second lateral surface corresponding to the first lateral surface, a secondary bevel connected to the first lateral surface, and a primary bevel that is connected to the second lateral surface and the secondary bevel. Moreover, a connection edge of the primary bevel and the secondary bevel is defined as a primary cutting edge that is arranged on the longitudinal reference plane. The first lateral surface and the longitudinal reference plane have a slanting angle therebetween that is within a range from 1 degree to 3 degrees, and the primary cutting edge and the transversal reference plane have a first angle therebetween that is within a range from 43 degrees to 47 degrees. The primary cutting edge has a first height along the longitudinal direction, the first height being within a range from 0.98 mm to 1.08 mm. The universal sheet is configured to be cut to form a screen protector through a cutting process of the cutting apparatus. The universal sheet includes a usage layer, a buffer layer, and a bottom layer. The usage layer includes a hardened film and a bonding film that is formed on the hardened film, and a hardness of the hardened film is at least 5H. The buffer layer includes a first buffer film attached onto the hardened film and a second buffer film that is attached onto the first buffer film. Moreover, a hardness of the hardened film, a hardness of the first buffer film, and a hardness of the second buffer film sequentially decrease, and a thickness of the hardened film, a thickness of the first buffer film, and a thickness of the second buffer film sequentially decrease. The bottom layer is attached onto the bonding film. When the universal sheet is placed on the cutting apparatus under the cutting process, the bottom layer of the universal sheet is fixed to the carrying machine, the displacement mechanism is driven by the processing module to enable the primary cutting edge of the cutter to cut the buffer layer and the usage layer along the hole cutting path for forming a positioning contour that has a plurality of positioning holes, and then along the screen cutting path for forming a screen contour that is located inside of the positioning contour, such that the buffer layer and the usage layer jointly define a screen region and a positioning region that surrounds the screen region and that has the positioning holes. The film applicator is located at a downstream of the cutting apparatus and includes an accommodating chamber configured to hold the mobile apparatus and a plurality of positioning pillars that is arranged on two opposite sides of the accommodating chamber. Moreover, a relative position of the positioning pillars is identical to a relative position of the positioning holes of the positioning contour, and a relative position between the positioning pillars and the screen of the mobile apparatus is identical to a relative position between the positioning holes and the screen contour. When the accommodating chamber of the film applicator holds the mobile apparatus and the positioning holes of the positioning region are respectively sleeved at the positioning pillars, the screen region faces toward the screen of the mobile apparatus for allowing the screen region to be pressed onto the screen.

In one of the possible or preferred embodiments, the primary cutting edge has a tip arranged away from the supporting segment and a top end that is arranged adjacent to the supporting segment, the primary bevel has a bottom side connected to the tip and a top side that is connected to the top end, and the first lateral surface and the second lateral surface are spaced apart from each other. The cutting segment has a first end surface and a second end surface. The first end surface is connected to the first lateral surface, the second lateral surface, and the bottom side of the primary bevel so as to jointly form the tip. The second end surface is connected to the first lateral surface, the second lateral surface, and the top side of the primary bevel so as to jointly form the top end.

In one of the possible or preferred embodiments, the first end surface has a secondary cutting edge that extends from the tip and that has a second height along the longitudinal direction, and the second height is within a range from 4 μm to 6 μm.

In one of the possible or preferred embodiments, the secondary bevel has an elongated shape being parallel to the primary cutting edge, a width of the secondary bevel is within a range from 0.01 mm to 0.03 mm, and an area of the primary bevel is at least 5 times an area of the secondary bevel.

In one of the possible or preferred embodiments, a bottom side of the primary bevel has a height along the longitudinal direction, the height being within a range from 0.73 mm to 0.77 mm. The supporting segment defines a central axis parallel to the longitudinal direction, and a distance between the first lateral surface and the central axis is less than a distance between the second lateral surface and the central axis. The second lateral surface and the transversal reference plane have a second angle therebetween that is within a range from 91 degrees to 91.5 degrees.

In one of the possible or preferred embodiments, the cutting segment is integrally connected to the supporting segment, the cutter includes an assembling segment, and the supporting segment is soldered onto the assembling segment.

In one of the possible or preferred embodiments, the universal sheet has an identification code arranged on the buffer layer, and the cutting apparatus further includes a scanner that is assembled to the carrying machine and that is electrically coupled to the processing module. The cutting and attaching system includes a cloud server that is electrically coupled to the processing module and the scanner. When the universal sheet is fixed onto the carrying machine, the scanner is configured to scan the identification code to generate a signal, such that the cloud server is configured to receive the signal through the processing module for allowing the cutting apparatus to perform the cutting process.

In one of the possible or preferred embodiments, the thickness of the second buffer film is within a range from 75% to 90% of the thickness of the first buffer film, and the thickness of the first buffer film is within a range from 60% to 75% of the thickness of the hardened film.

In one of the possible or preferred embodiments, a sum of the thickness of the first buffer film and the thickness of the second buffer film is within a range from 95% to 105% of a thickness of the bonding film, and the thickness of the hardened film is within a range from 75% to 90% of the thickness of the bonding film.

In one of the possible or preferred embodiments, the supporting segment has a surrounding surface having a circular shape, the first lateral surface is a planar lateral surface, and the second lateral surface is a curved lateral surface that is flush with the surrounding surface of the supporting segment.

Therefore, the cutting and attaching system in the present disclosure is operated through the cooperation of the cutting apparatus, the universal sheet, and the film applicator, so that the cutting apparatus can perform the cutting process to the universal sheet having at least 5H hardness according to the film applicator and the mobile apparatus, thereby forming the screen protector that is suitable to be applied to the film applicator and the mobile apparatus and that has no burrs and no scratchy structure. Accordingly, the cutting and attaching system can be used to implement a customized film attaching requirement by cutting the universal sheet until attaching the screen protector onto the mobile apparatus.

Moreover, the cutting and attaching system in the present disclosure is provided with the cutting segment having the specific features (e.g., a scope of the slanting angle, the arrangement of the secondary bevel, the first angle corresponding to the primary cutting edge and being within a range from 43 degrees to 47 degrees, and the first height of the primary cutting edge being within a range from 0.98 mm to 1.08 mm), thereby facilitating the cutting of the universal sheet (or the hardened film) that has at least 5H hardness.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
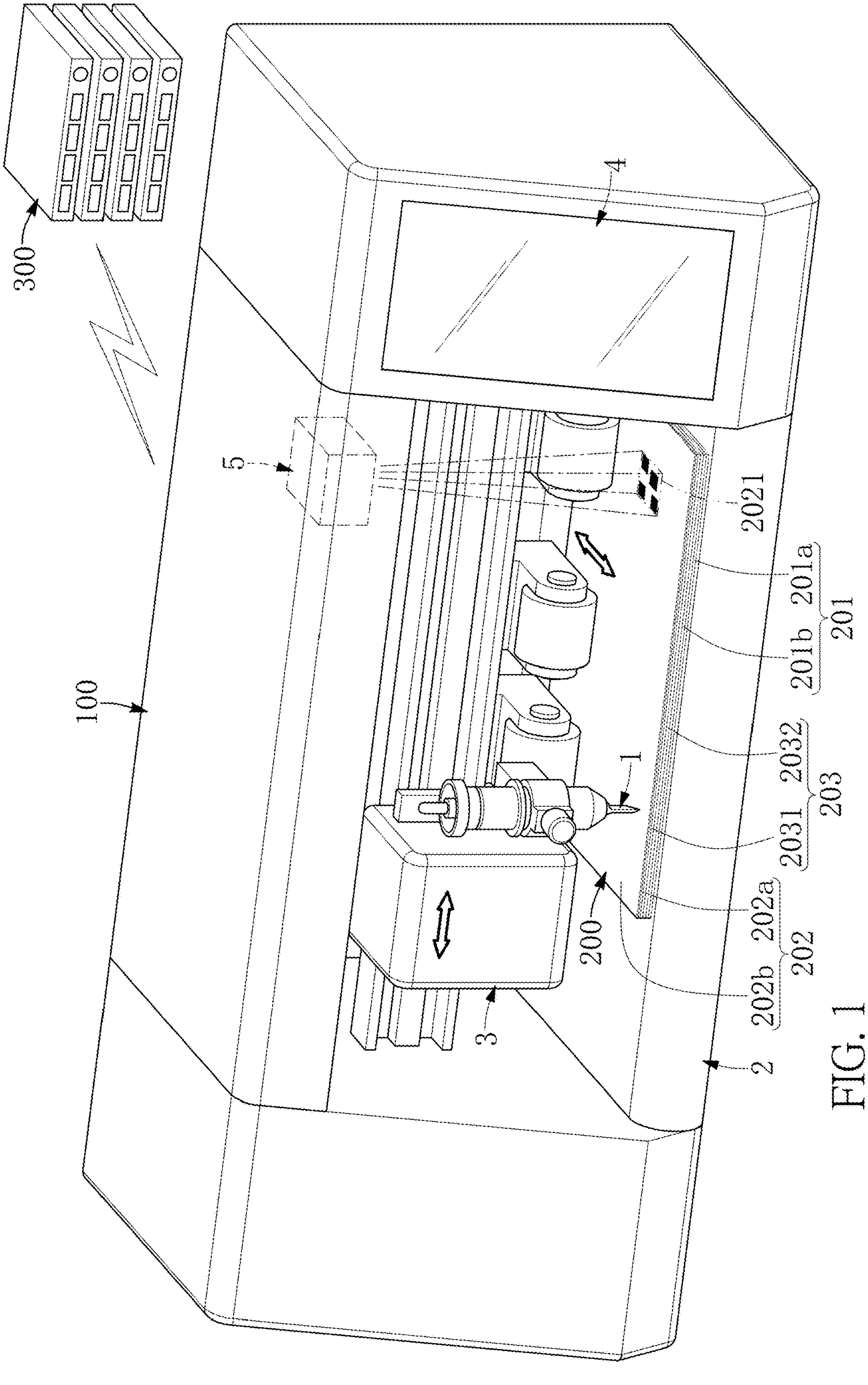
FIG. 1 is a schematic view of a cutting and attaching system for a screen protector having a high hardness according to a first embodiment of the present disclosure.
Figure 2:
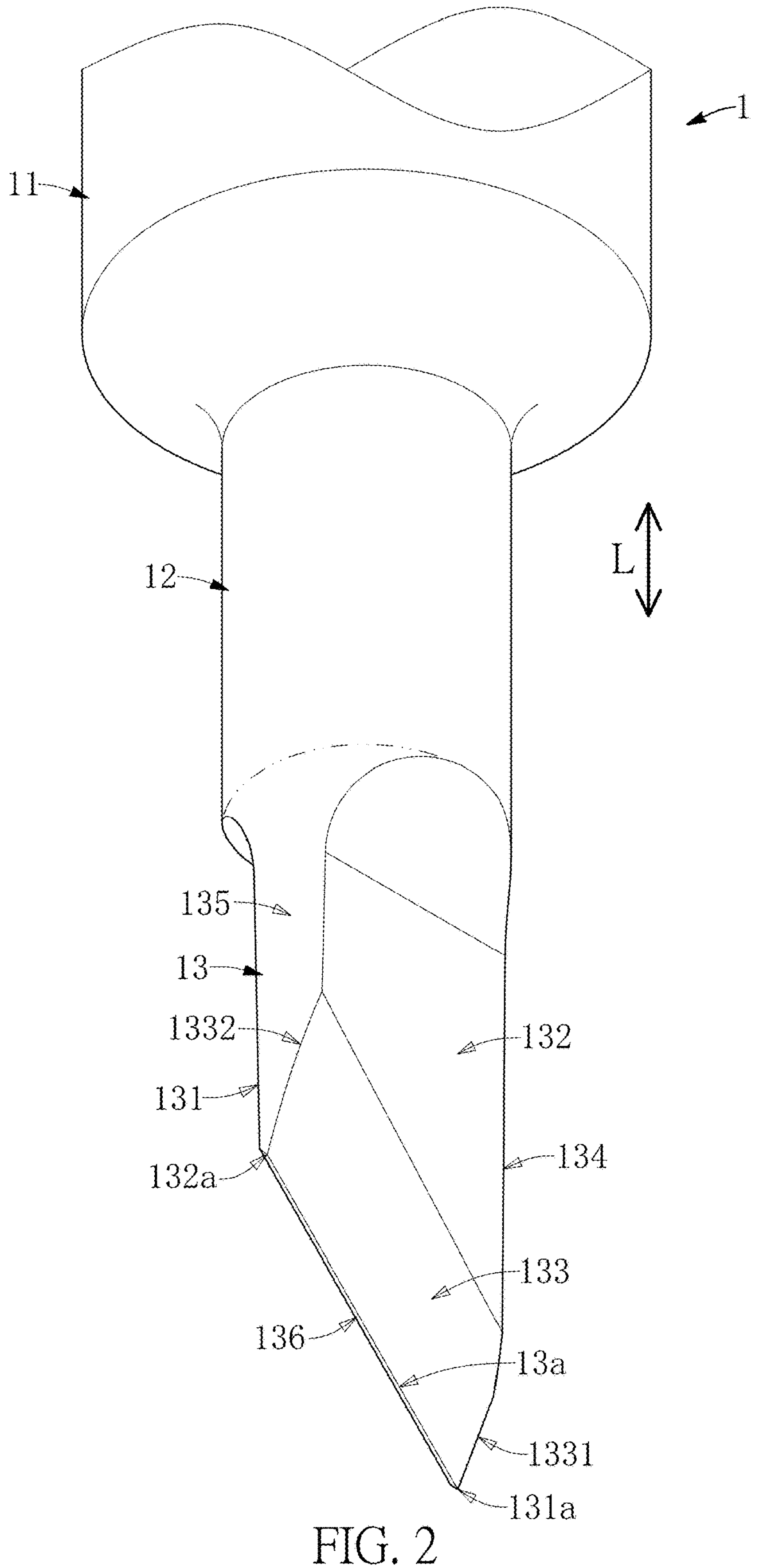
FIG. 2 is a schematic perspective view of a cutter of the cutting and attaching system according to the first embodiment of the present disclosure.
Figure 3:
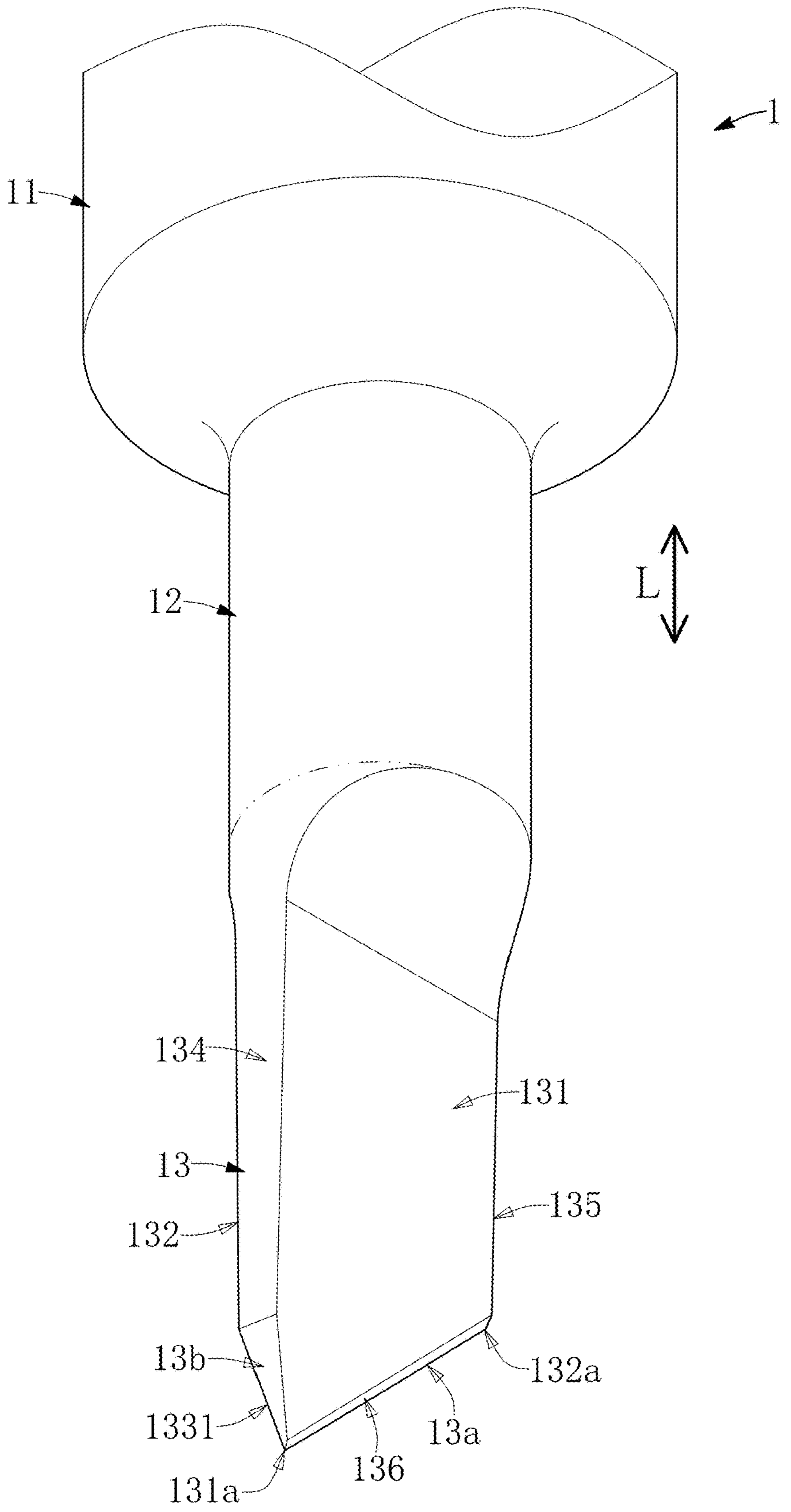
FIG. 3 is a schematic perspective view of FIG. 2 from another angle of view.
Figure 4:
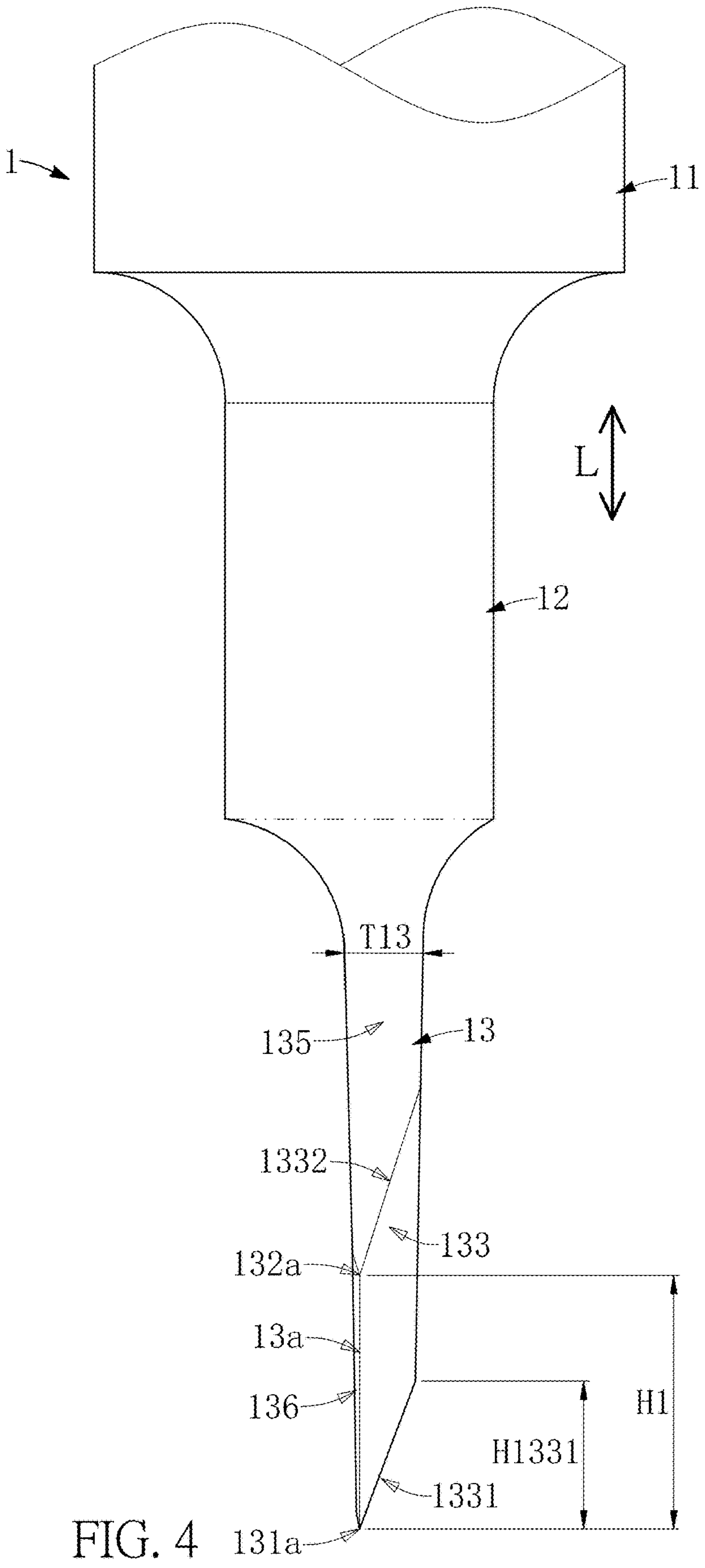
FIG. 4 is a schematic front view of FIG. 2.
Figure 5:
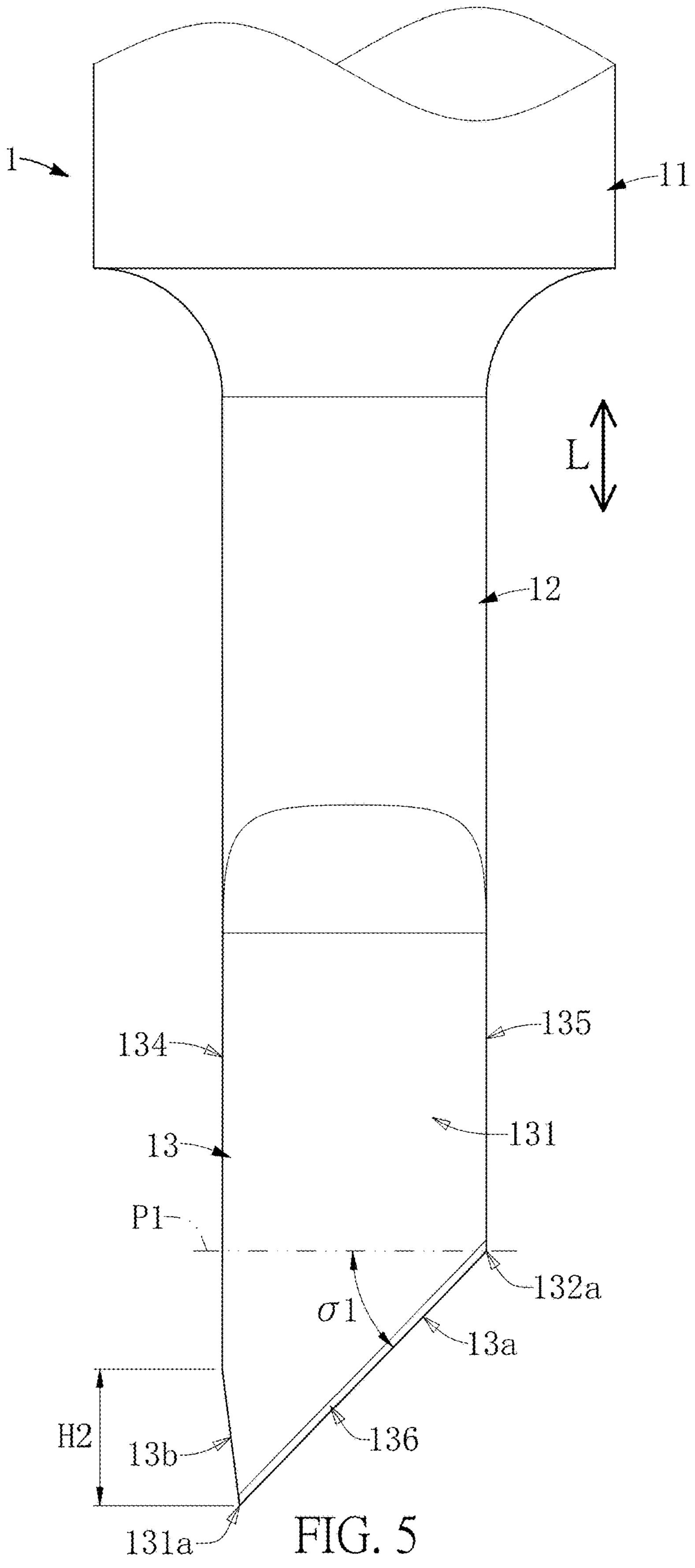
FIG. 5 is a schematic side view of FIG. 2.
Figure 6:
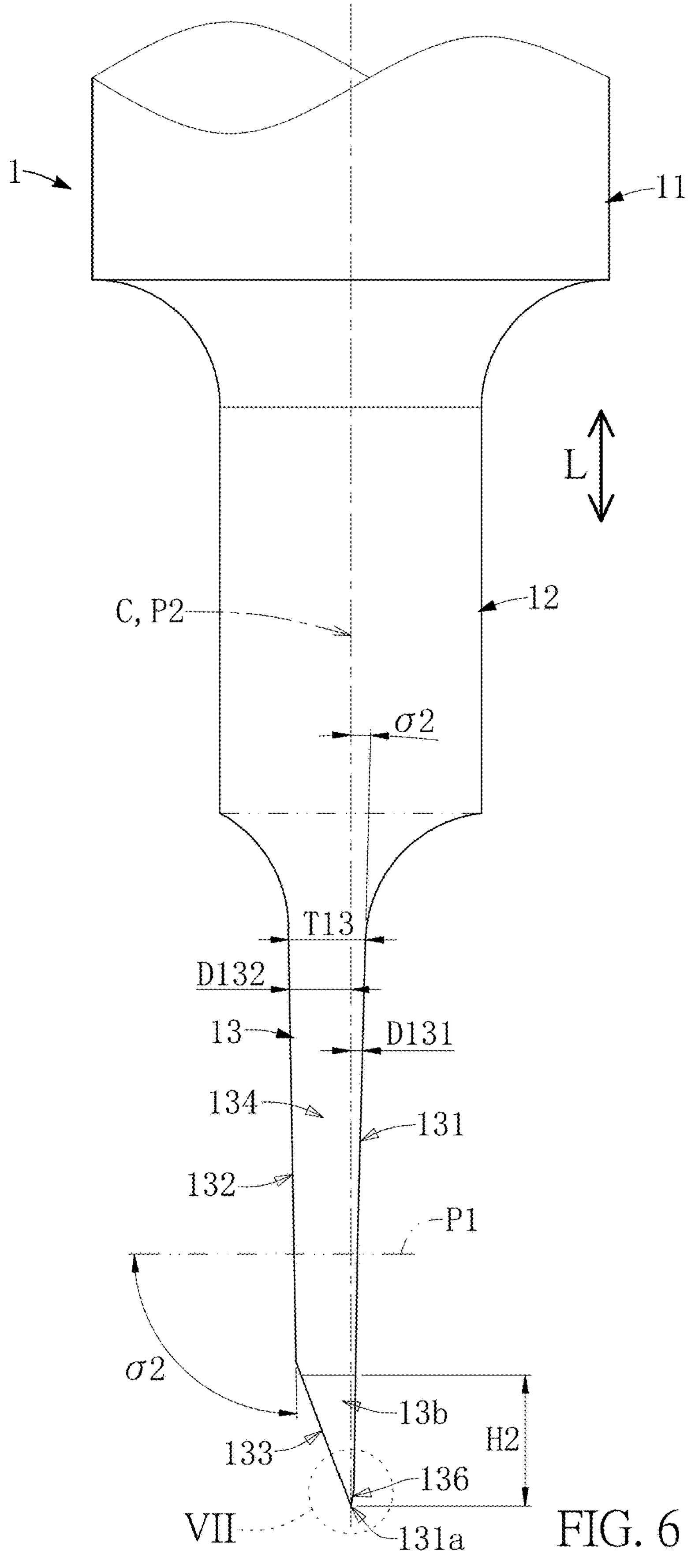
FIG. 6 is a schematic front view of FIG. 3.
Figure 7:
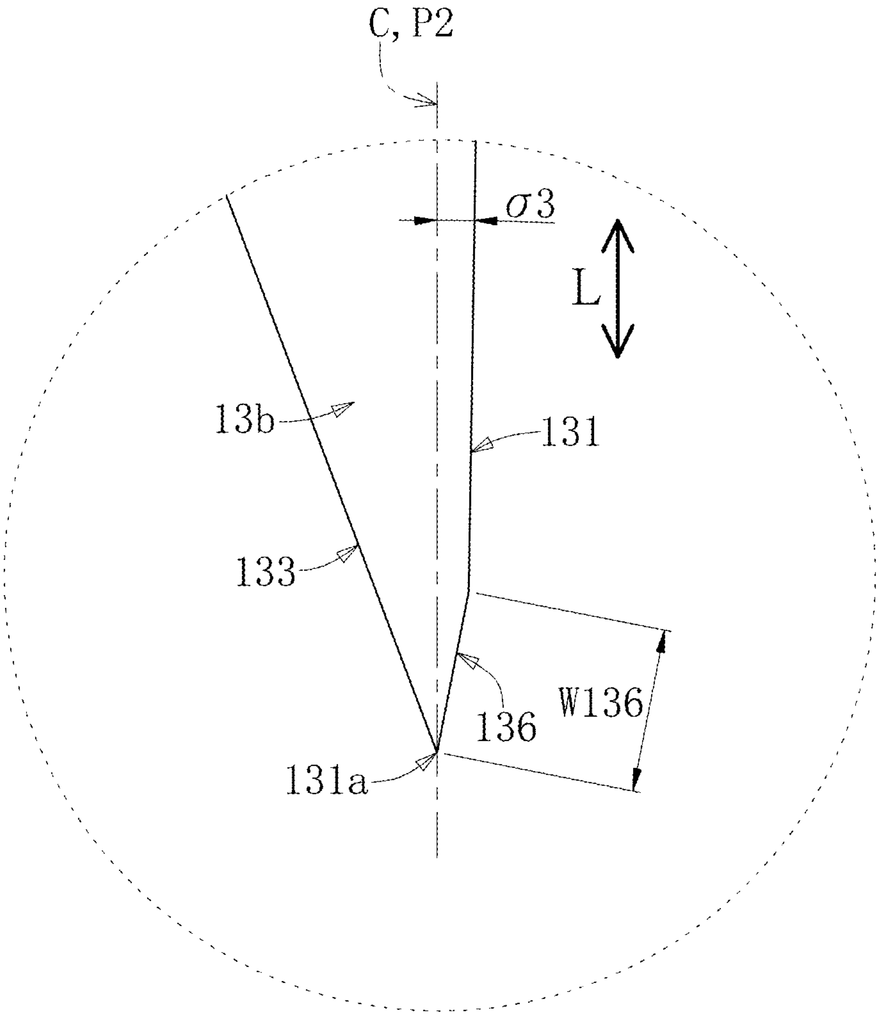
FIG. 7 is a schematic enlarged view of part VII of FIG. 6.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 13, a first embodiment of the present disclosure is provided. The present embodiment provides a cutting and attaching system for a screen protector having a high hardness. The cutting and attaching system includes a cutting apparatus 100, a universal sheet 200 being suitable for (or applied to) the cutting apparatus 100, a cloud server 300 electrically coupled to the cutting apparatus 100, and a film applicator 400 (shown in FIG. 10 to FIG. 13) that is located at a downstream of the cutting apparatus 100, but the present disclosure is not limited thereto. For example, in other embodiments of the present disclosure not shown in the drawings, the cutting and attaching system can be provided without the cloud server 300 according to practical requirements.

It should be noted that the cutting and attaching system is preferably provided for manufacturers that need to attach screen protectors onto various mobile apparatus, and the cutting apparatus 100 can perform a cutting process to the universal sheet 200 so as to form a screen protector 200S that corresponds to a selected type of mobile apparatus, thereby providing a customized function for cutting film. In other words, a cutting apparatus not having a customized function is different from the cutting and attaching system provided by the present embodiment. In addition, the mobile apparatus of the present embodiment is a mobile phone, but in other embodiments of the present disclosure not shown in the drawings, the mobile apparatus can be changed according to practical requirements (e.g., a tablet, a watch, or a camera).

Moreover, the universal sheet 200 in the present embodiment includes a bottom layer 201, a buffer layer 202, and a usage layer 203 that is sandwiched between the bottom layer 201 and the buffer layer 202. The usage layer 203 includes a hardened film 2031 and a bonding film 2032 that is opposite to the hardened film 2031. The bottom layer 201 is attached onto the bonding film 2032 of the usage layer 203, and the buffer layer 202 is attached onto the hardened film 2031 of the usage layer 203. Furthermore, in order to enable the universal sheet 200 to not produce burrs and to have a smooth periphery that is not scratchy after being cut, the universal sheet 200 is preferably provided with at least part of following features, but the present disclosure is not limited thereto. The bonding film 2032 is formed on the hardened film 2031, and a hardness of the hardened film 2031 is at least 5H. The buffer layer 202 includes a first buffer film **202*a* attached onto the hardened film 2031 and a second buffer film 202*b* that is attached onto the first buffer film 202*a*. In addition, the bottom layer 201 can be a cut-proof board 201*a*; or, the bottom layer 201 can include the cut-proof board 201*a* and a dust removal film 201*b* that is connected in-between the cut-proof board 201*a* and the bonding film 2032**, but the present disclosure is not limited thereto.

Moreover, a hardness of the hardened film 2031, a hardness of the first buffer film **202*a*, and a hardness of the second buffer film 202*b* sequentially decrease, and a thickness of the hardened film 2031, a thickness of the first buffer film 202*a*, and a thickness of the second buffer film 202*b* sequentially decrease. In the present embodiment, the thickness of the second buffer film 202*b* is within a range from 75% to 90% of the thickness of the first buffer film 202*a*, and the thickness of the first buffer film 202*a* is within a range from 60% to 75% of the thickness of the hardened film 2031. In other words, a sum of the thickness of the first buffer film 202*a* and the thickness of the second buffer film 202*b* is within a range from 95% to 105% of a thickness of the bonding film 2032, and the thickness of the hardened film 2031 is within a range from 75% to 90% of the thickness of the bonding film 2032**.

For example, the first buffer film **202*a* is made of a soft material, the thickness of the first buffer film 202*a* can be within a range from 75 μm to 90 μm, the thickness of the second buffer film 202*b* can be within a range from 95 μm to 110 μm, the thickness of the hardened film 2031 can be within a range from 130 μm to 190 μm, the bonding film 2032 is a high-sticky AB glue, and the thickness of the bonding film 2032 can be within a range from 150 μm to 225 μm. A thickness of the cut-proof board 201*a* is within a range from 175 μm to 225 μm, and the dust removal film 201*b*** is white and has a thickness being within a range from 100 μm to 150 μm.

In addition, the universal sheet 200 of the present embodiment has an identification code 2021 (e.g., a QR code) arranged on the buffer layer 202. The identification code 2021 can be directly printed on the buffer layer 202 or can be additionally adhered to the buffer layer 202, but the present disclosure is not limited thereto. For example, in other embodiments of the present disclosure not shown in the drawings, a quantity of layers of the universal sheet 200 can be adjusted or changed according to practical requirements (e.g., the bottom layer 201 can be omitted).

Specifically, a hardness (e.g., a pencil hardness) of the universal sheet 200 (or the hardened film 2031) is limited to having at least 5H, and an area of the universal sheet 200 is greater than an area of a screen of any mobile apparatus on the market. Accordingly, any cutting apparatus intended only for cutting soft sheets is different from the cutting and attaching system provided by the present embodiment.

Moreover, the material of the universal sheet 200 can be adjusted or changed according to practical requirements. For example, the universal sheet 200 can be a flexible screen protector, or can be made of polyethylene terephthalate (PET), recycled polyethylene terephthalate (RPET), or polymethyl methacrylate (PMMA), but the present disclosure is not limited thereto.

Specifically, in order to cut the universal sheet 200 having the hardness of at least 5H, the cutting apparatus 100 needs to have a cutter 1 having a specific structural design. In other words, the structural design of the cutter 1 is a key point for enabling the cutting apparatus 100 to cut the universal sheet 200 that has the hardness of at least 5H. In the present embodiment, through the cooperation of the cutter 1 and the universal sheet 200, the cutting apparatus 100 can cut the universal sheet 200 having the hardness of 7H, and the bonding film 2032 can be prevented from generating burrs and can be formed with a smooth periphery that is not scratchy after being cut. Accordingly, the following description describes the cutter 1, and then describes other components of the cutting apparatus 100.

As shown in FIG. 2 to FIG. 7, the cutter 1 defines a transversal reference plane P1 perpendicular to a longitudinal direction L thereof and a longitudinal plane P2 that is perpendicular to the transversal reference plane P1. In the present embodiment, the cutter 1 includes an assembling segment 11, a supporting segment 12 connected to the assembling segment 11, and a cutting segment 13 that is connected to the supporting segment 12. The cutting segment 13 is integrally connected to the supporting segment 12, and the supporting segment 12 is soldered onto the assembling segment 11. In other words, a structure of the cutter 1 is formed by connecting two pieces, and the structure of the cutter 1 is preferably not a single one-piece structure.

In other words, the assembling segment 11 and the cutting segment 13 are respectively connected to two opposite ends of the supporting segment 12, and the supporting segment 12 is connected to a substantial center of and an end surface of the assembling segment 11, and the cutting segment 13 has an offset relative to an end surface of the supporting segment 12, but the present disclosure is not limited thereto.

The cutting segment 13 (e.g., an outer surface of the cutting segment 134) has a first lateral surface 131, a second lateral surface 132 spaced apart from the first lateral surface 131, a secondary bevel 136 connected to the first lateral surface 131, and a primary bevel 133 that is connected to the second lateral 132 and the secondary bevel 136. Each of the first lateral 131, the second lateral surface 132, and the primary bevel 133 is flat and planar, and a connection edge of the primary bevel 133 and the secondary bevel 136 is defined as a primary cutting edge 13*a* that is arranged on the longitudinal reference plane P2. The secondary bevel 136 has an elongated shape being parallel to the primary cutting edge 13*a*.

The first lateral surface 131 and the longitudinal reference plane P2 have a slanting angle σ3 therebetween that is within a range from 1 degree to 3 degrees, and the primary cutting edge 13*a* and the transversal reference plane P1 have a first angle σ1 therebetween that is within a range from 43 degrees to 47 degrees. The primary cutting edge 13*a* has a first height H1 along the longitudinal direction L, and the first height H1 is within a range from 0.98 mm to 1.08 mm. In addition, a width W136 of the secondary bevel 136 is within a range from 0.01 mm to 0.03 mm, and an area of the primary bevel 133 is at least 5 times an area of the secondary bevel 136.

Accordingly, the cutter 1 is provided with the cutting segment 13 having specific conditions to facilitate cutting of the universal sheet 200. In order to enable the cutter 1 to easily cut the universal sheet 200, the cutter 1 preferably has at least part of the following features, but the present disclosure is not limited thereto.

Specifically, the supporting segment 12 defines a central axis C parallel to the longitudinal direction L, and the central axis C in the present embodiment is arranged on the longitudinal reference plane P2, but the present disclosure is not limited thereto. Furthermore, a distance D131 between the first lateral surface 131 and the central axis L is less than a distance D132 between the second lateral surface 132 and the central axis L. The second lateral surface 132 and the transversal reference plane P1 have a second angle σ2 therebetween that is within a range from 91 degrees to 91.5 degrees.

Moreover, the primary cutting edge 13*a* has a tip 131*a* arranged away from the supporting segment 12 and a top end 132*a* that is arranged adjacent to the supporting segment 12, and the primary bevel 133 has a bottom side 1331 connected to the tip 131*a* and a top side 1332 that is connected to the top end 132*a*. The bottom side 1331 of the primary bevel 133 has a height H1331 along the longitudinal direction L, and the height H1331 is within a range from 0.73 mm to 0.77 mm.

The cutting segment 13 has a first end surface 134 and a second end surface 135 that is spaced apart from the first end surface 134. The first end surface 134 is connected to the first lateral surface 131, the second lateral surface 132, and the bottom side 1331 of the primary bevel 133 so as to jointly form (or define) the tip 131*a*. The second end surface 135 is connected to the first lateral surface 131, the second lateral surface 132, and the top side 1332 of the primary bevel 133 so as to jointly form (or define) the top end 132*a*.

The first lateral surface 131, the first end surface 134, the second lateral surface 132, and the second end surface 135 are connected to jointly form a loop shape and are jointly defined as a surrounding surface of the cutting segment 13. The first lateral surface 131 and the second lateral surface 132 are spaced apart from each other by a blade thickness T13 that has a same value in a direction from the first end surface 134 to the second end surface 135, but the present disclosure is not limited thereto. In other words, in other embodiments of the present disclosure not shown in the drawings, the blade thickness T13 can gradually increase from the tip 131*a* to the top end 132*a*, thereby effectively supporting the primary cutting edge 13*a*. Specifically, the blade thickness T13 is preferably within a range from 0.26 mm to 0.31 mm, but the present disclosure is not limited thereto.

The first end surface 134 has a secondary cutting edge 13*b* that extends from the tip 131*a* and that has a second height H2 along the longitudinal direction L, and the second height H2 is within a range from 4 μm to 6 μm. Accordingly, the primary cutting edge 13*a* and the secondary cutting edge 13*b* of the cutter 1 are cooperated with each other through the above specific conditions thereof, thereby facilitating the cutting of the universal sheet 200, effectively preventing the bonding film 2032 of the universal sheet 200 from generating burrs, and enabling the universal sheet 200 to have a smooth periphery that is not scratchy after being cut.

It should be noted that the supporting segment 12 and the cutting segment 13 of the cutter 1 are preferably made of tungsten steel or tungsten powder metallurgy high-speed steel, an outer surface of the cutting segment 13 can be further formed with a diamond like carbon (DLC) coating layer that is an amorphous coating film composed of carbon and hydrogen and that combines the high hardness of diamond and the lubricity of graphite, and the DLC coating layer is preferably formed in a PVD manner or a PACVD manner, but the present disclosure is not limited thereto. For example, the cutter 1 can be made of other materials, or the outer surface of the cutter 1 can have other hardening treatments. Moreover, the supporting segment 12 and the cutting segment 13 in the present embodiment can be made of a non-magnetizable material, and the assembling segment 11 can be made of a magnetizable material.

In addition, the cutter 1 in the present embodiment is applied to the cutting apparatus 100, but the present disclosure is not limited thereto. For example, in other embodiments of the present disclosure not shown in the drawings, the cutter 1 can be independently used (e.g., sold) or can be used in cooperation with other components.

Figure 8:
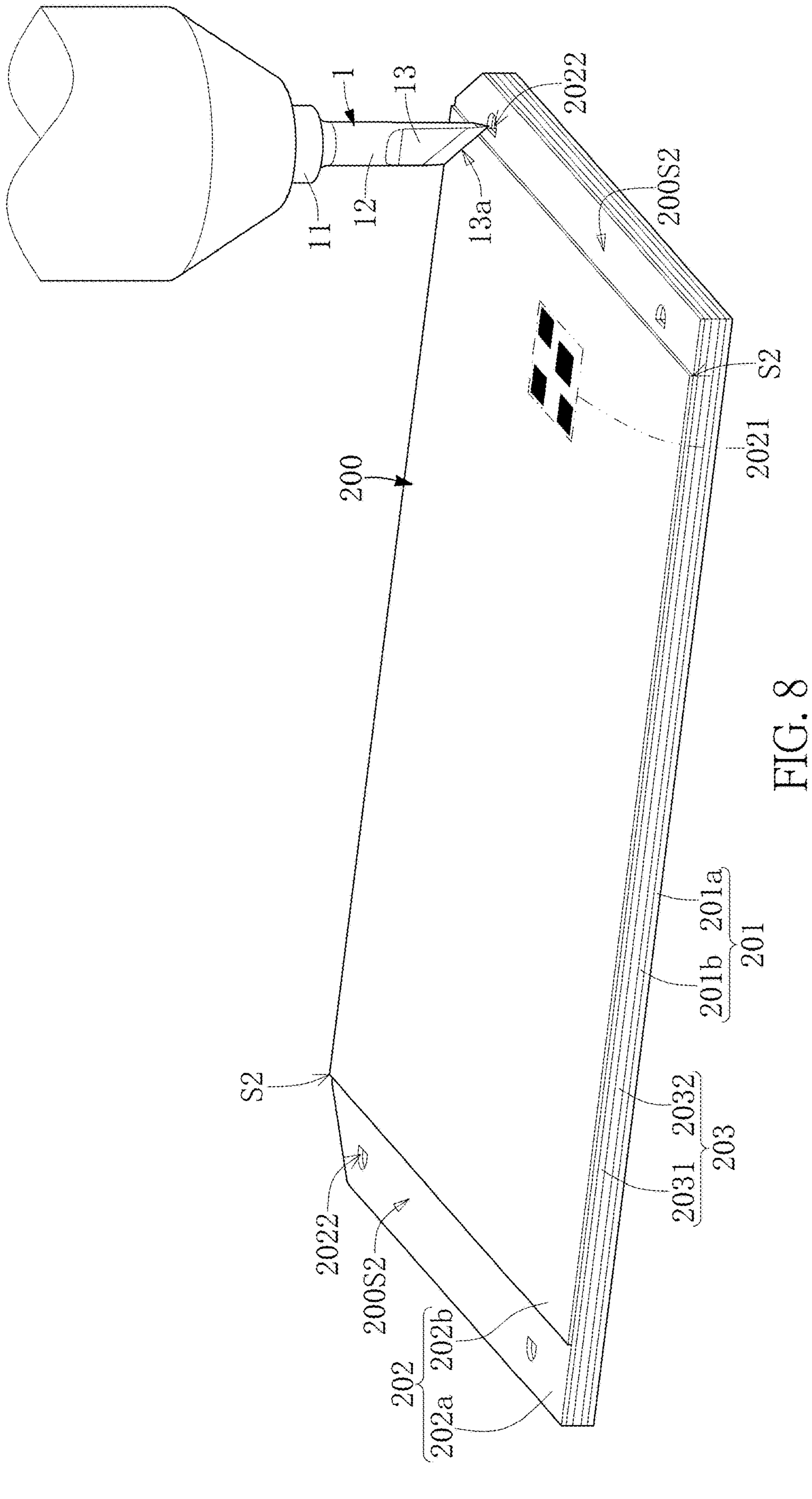
FIG. 8 is a schematic view showing the cutter of FIG. 1 that cuts a universal sheet along a hole cutting path.
Figure 9:
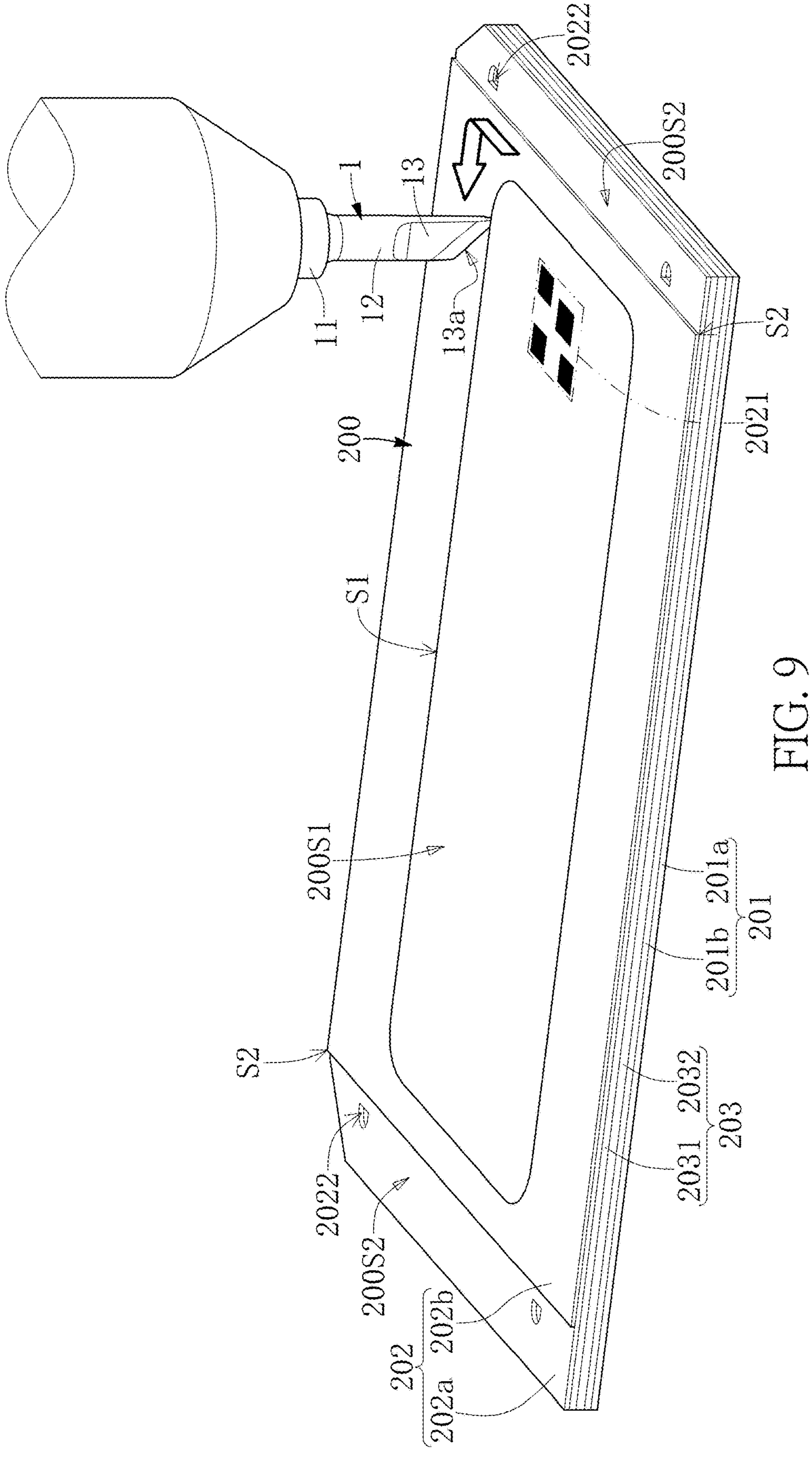
FIG. 9 is schematic view showing the cutter of FIG. 1 that cuts the universal sheet along a screen cutting path.
Figure 10:
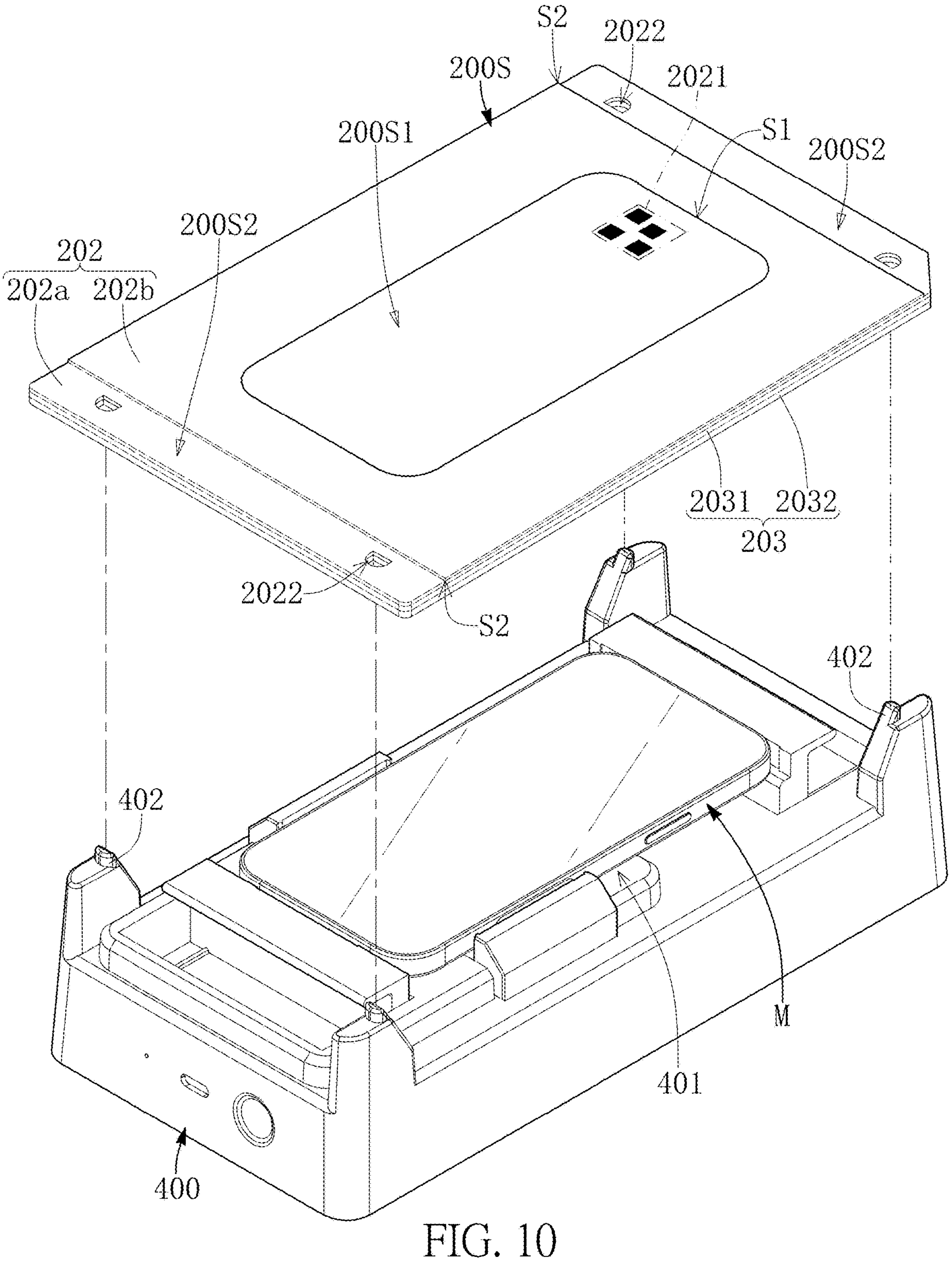
FIG. 10 is a schematic view showing the cutting and attaching system that performs an attaching process.
Figure 11:
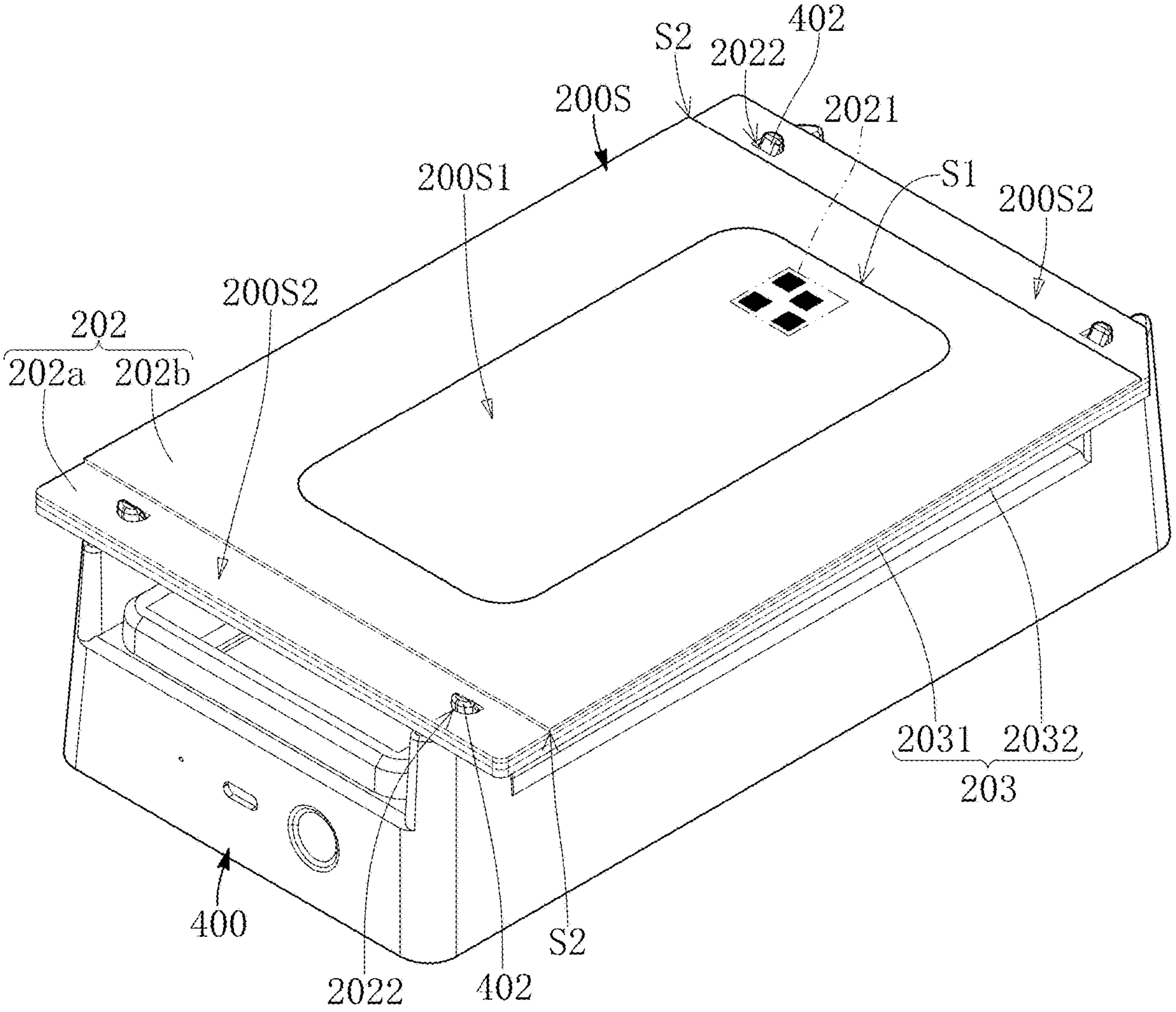
FIG. 11 is a schematic view showing an operation following that of FIG. 10.
Figure 12:
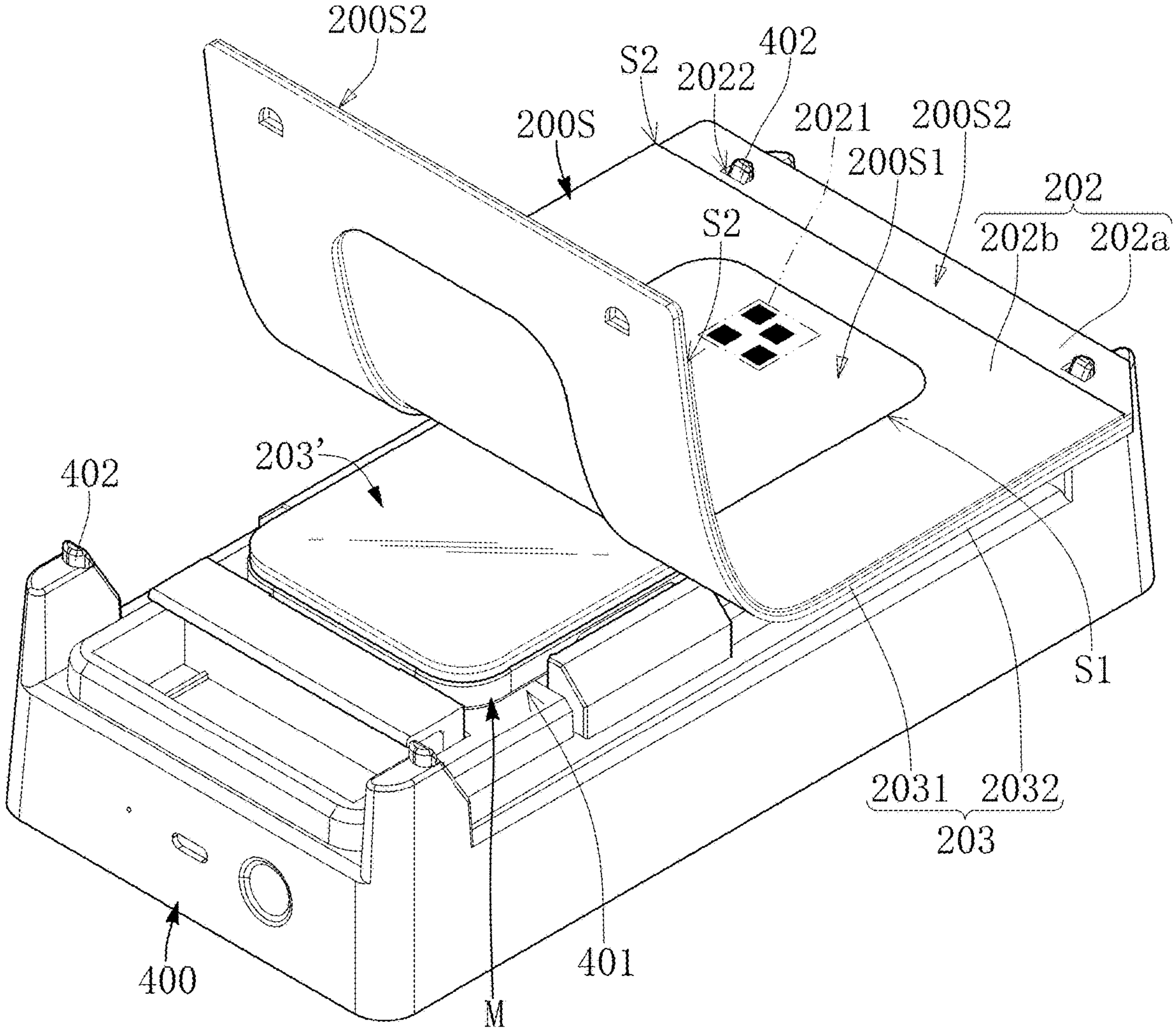
FIG. 12 is a schematic view showing a following operation of FIG. 11.
Figure 13:
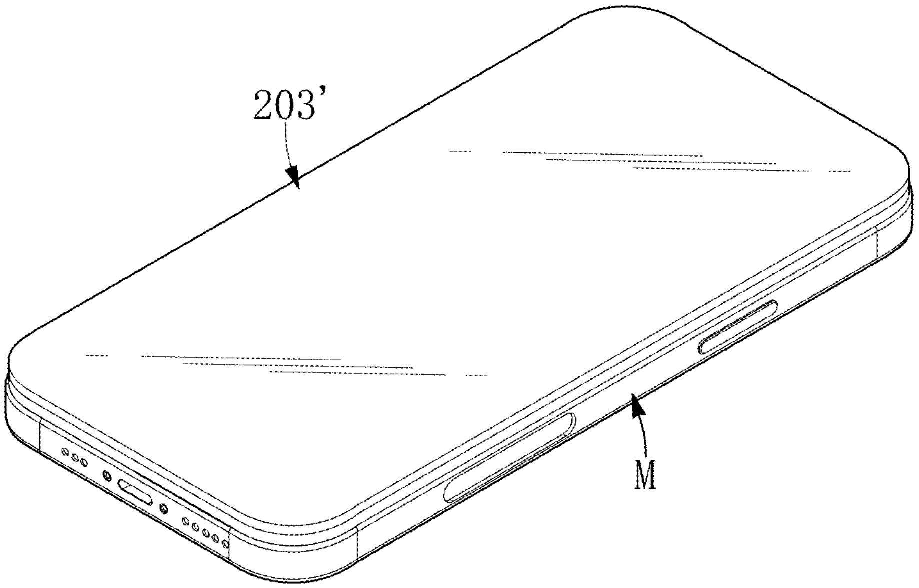
FIG. 13 is a schematic view showing a following operation of FIG. 12.

As shown in FIG. 1, FIG. 8, and FIG. 9, the structure of the cutter 1 is described in the above description, and the following description describes other components of the cutting apparatus 100. The cutting apparatus 100 includes a carrying machine 2, a displacement mechanism 3, a processing module 4, and a scanner 5. The carrying machine 2, the displacement mechanism 3, the processing module 4, and the scanner 5 are assembled to the carrying machine 2, and the displacement mechanism 3 and the scanner 5 are electrically coupled to the processing module 4.

Moreover, the displacement mechanism 3 is movable relative to the carrying machine 2, and the processing module 4 is configured to move the displacement mechanism 3 along a screen cutting path and a hole cutting path that is different from the screen cutting path by being electrically coupled to the displacement mechanism 3. The cutter 1 is assembled to the displacement mechanism 3 through the assembling segment 11, such that the cutter 1 and the displacement mechanism 3 can be moved synchronously. In the present embodiment, the assembling segment 11 is made of a magnetizable material and can be fixed to the displacement mechanism 3 in a magnetic attraction manner, such that when the cutter 1 and the displacement mechanism 3 are moved, the displacement mechanism 3 can be operated to rotate the assembling segment 11 by changing a magnetism relative to the assembling segment 11.

In addition, the cloud server 300 is electrically coupled to the processing module 4 and the scanner 5. When the universal sheet 200 is fixed onto the carrying machine 2, the scanner 5 is configured to scan the identification code 2021 to generate a signal, such that the cloud server 300 is configured to receive the signal through the processing module 4 for allowing the cutting apparatus 100 to perform the cutting process by choosing a corresponding pattern file and for enabling the cutting apparatus 100 to identify a material of the universal sheet 200.

It should be noted that the processing module 4 in the present embodiment further includes a touch panel for providing a user to input a type of the mobile apparatus that is required to be attached with a screen protector. Accordingly, the cutting apparatus 100 can perform the cutting process that corresponds to the type of the mobile apparatus that is inputted into the processing module 4 by the user (e.g., the screen cutting path corresponding to a contour of a screen of the mobile apparatus), but the present disclosure is not limited thereto. For example, in other embodiments of the present disclosure not shown in the drawings, the processing module 4 can obtain the type of the mobile apparatus by receiving a signal from an external apparatus (e.g., a computer or a user's mobile phone) in other manners.

When the universal sheet 200 is placed on the cutting apparatus 100 under the cutting process for forming the screen protector 200S, the universal sheet 200 is fixed to the carrying machine 2, the displacement mechanism 3 is driven by the processing module 4 to enable the primary cutting edge **13*a* of the cutter 1 to cut the buffer layer 202 and the usage layer 203 along the hole cutting path for forming a positioning contour S2 that has a plurality of positioning holes 2022**, and then along the screen cutting path for forming a screen contour S1 that is located inside of the positioning contour S2.

Specifically, the cutting apparatus 100 is configured to cut the universal sheet 200 from the buffer layer 202 and does not cut the universal sheet 200 from the bonding film 2032 of the usage layer 203, such that damage to an adhesive side of the bonding film 2032 can be effectively avoided, burrs can be prevented from being forming on the usage layer 203, and the screen contour S1 can have a smooth periphery that is not scratchy after being cut.

It should be noted that the displacement mechanism 3 can drive the cutter 1 to move relative to the universal sheet 200 along an X axial direction, a Y axial direction, and a Z axial direction, which are perpendicular to each other, and a moved object (e.g., the cutter 1 or the universal sheet 200) can be adjusted or changed according to practical requirements. For example, the cutter 1 can be moved along the X axial direction and the Z axial direction by the displacement mechanism 3, and the universal sheet 200 can be moved along the Y axial direction by the displacement mechanism 3, such that the cutter 1 can be moved relative to the universal sheet 200 along the hole cutting path and the screen cutting path.

Moreover, after the universal sheet 200 is cut to form the screen protector 200S by performing of the cutting process, the buffer layer 202 and the usage layer 203 jointly define a screen region 200S1 and a positioning region 200S2 that surrounds the screen region 200S1 and that has the positioning holes 2022. In other words, a portion 203' of the usage layer 203 arranged inside of the screen contour S1 is provided for attaching onto a screen of a mobile apparatus M.

As shown in FIG. 10 to FIG. 13, the film applicator 400 includes an accommodating chamber 401 and a plurality of positioning pillars 402 that are arranged on two opposite sides of the accommodating chamber 401. The accommodating chamber 401 is configured to hold the mobile apparatus M. Moreover, a relative position of the positioning pillars 402 is identical to a relative position of the positioning holes 2022 of the positioning contour S2, and a relative position between the positioning pillars 402 and the screen of the mobile apparatus M is identical to a relative position between the positioning holes 2022 and the screen contour S1 (or edges of the screen region 200S1). The relative position of the positioning pillars 402 of the film applicator 400 preferably has a fixed position and cannot be changed, but the present disclosure is not limited thereto.

Accordingly, when the accommodating chamber 401 of the film applicator 400 holds the mobile apparatus M, and the positioning holes 2022 of the positioning region 200S2 are respectively sleeved at the positioning pillars 402, the screen region 200S1 (e.g., the portion 203' of the usage layer 203) faces toward the screen of the mobile apparatus M for allowing the screen region 200S 1 to be pressed and attached onto the screen of the mobile apparatus M.

Second Embodiment

Figure 14:
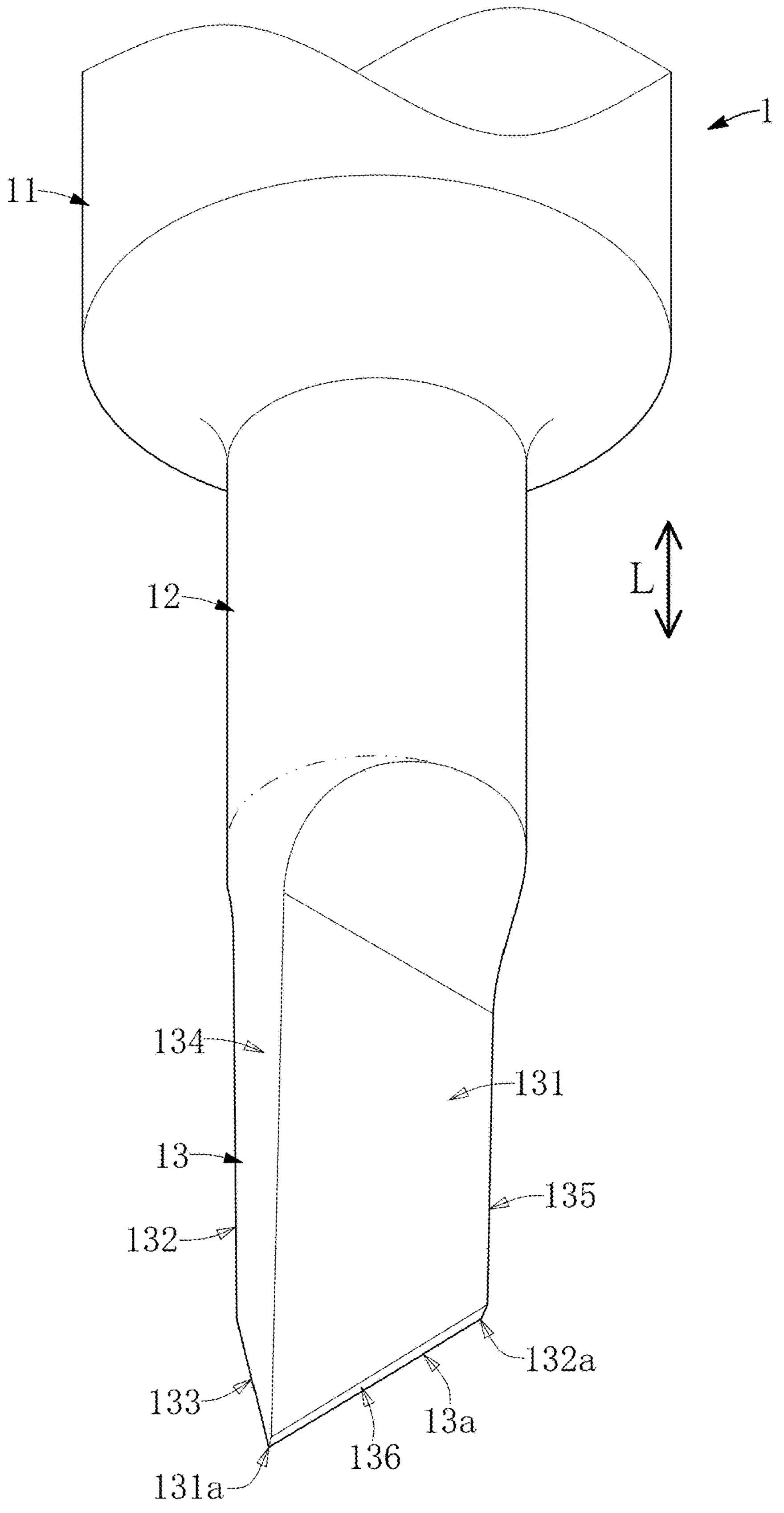
FIG. 14 is a schematic perspective view of the cutter according to a second embodiment of the present disclosure.
Figure 15:
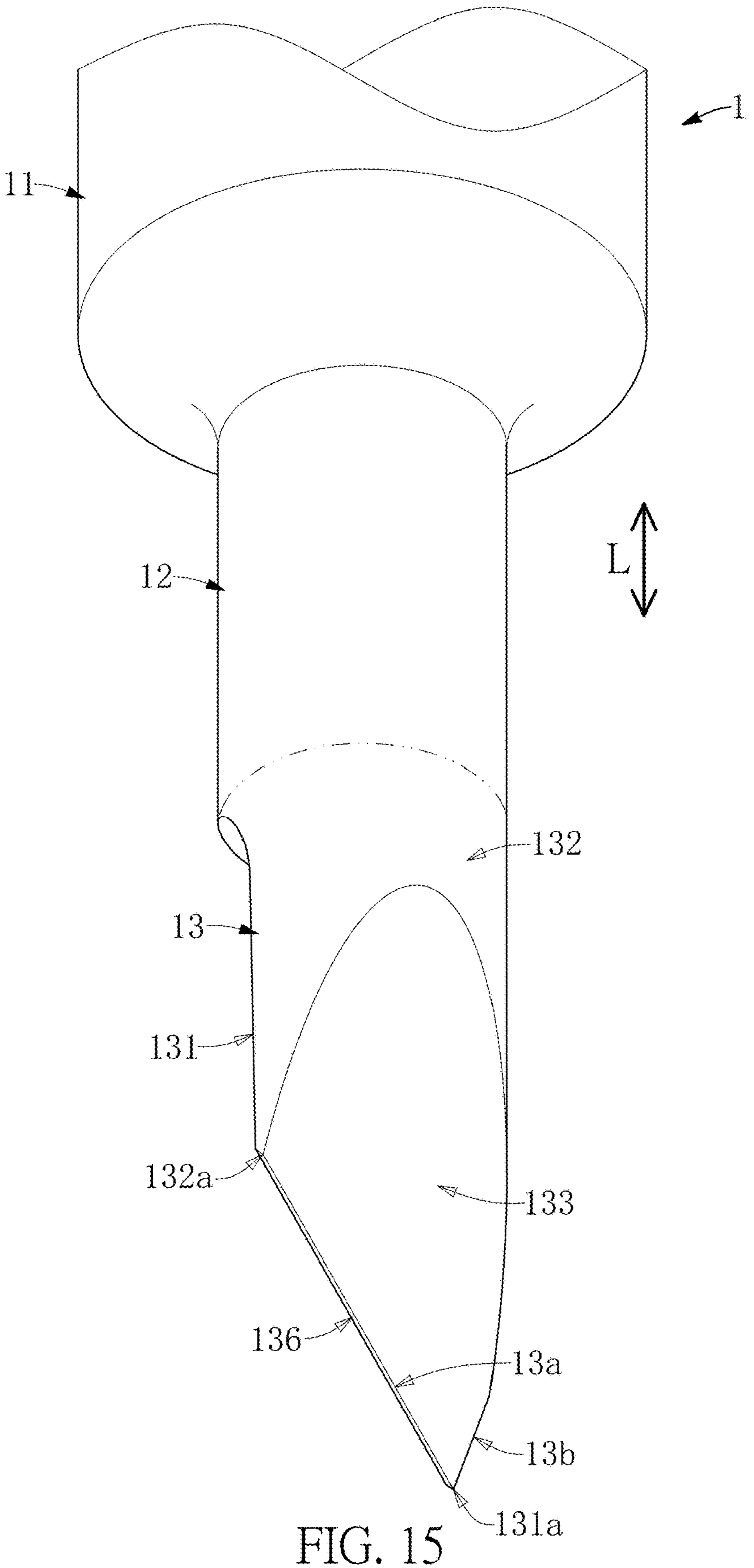
FIG. 15 is a schematic perspective view of the cutter having another configuration according to the second embodiment of the present disclosure.
Figure 16:
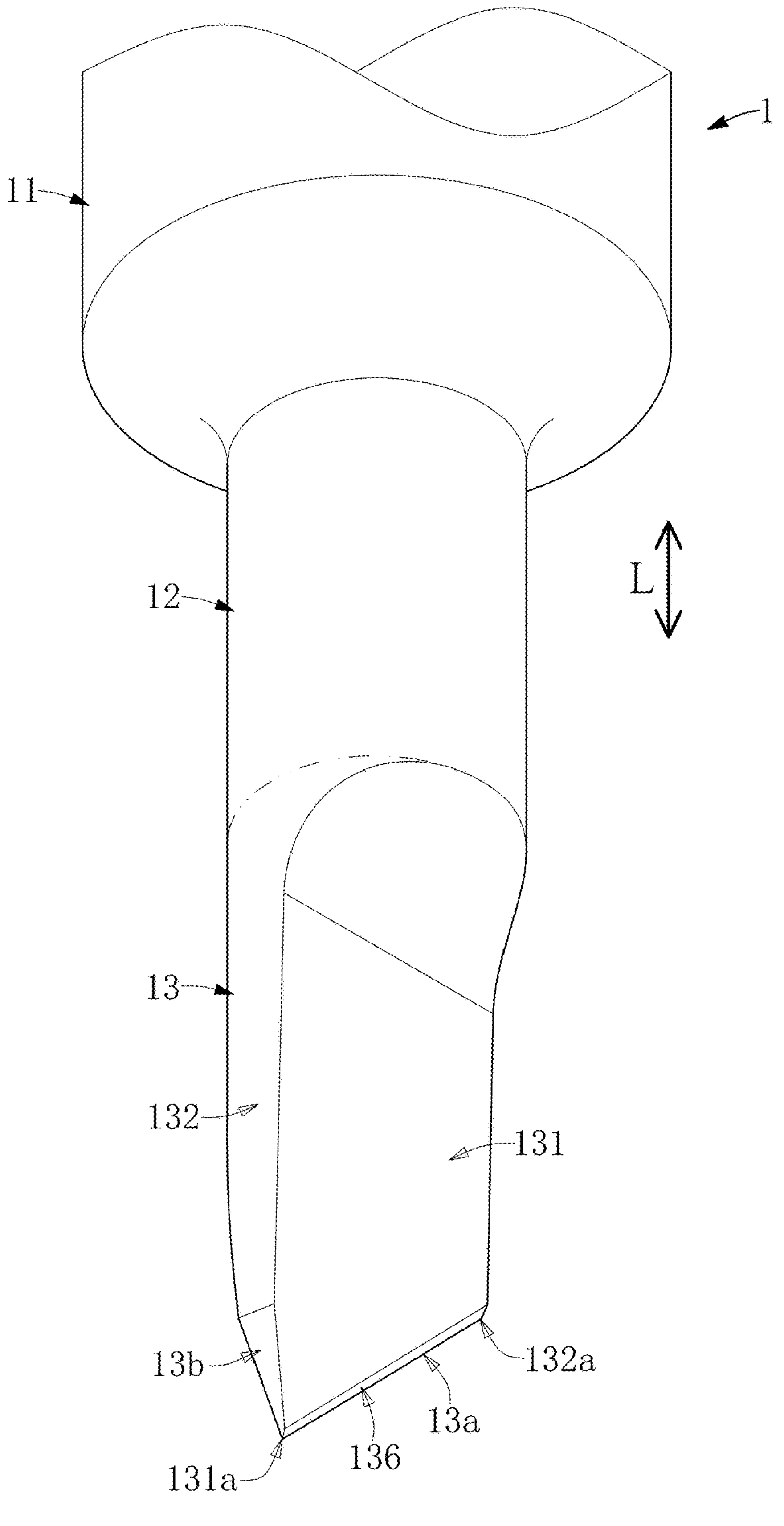
FIG. 16 is a schematic perspective view of FIG. 15 from another angle of view.
Figure 17:
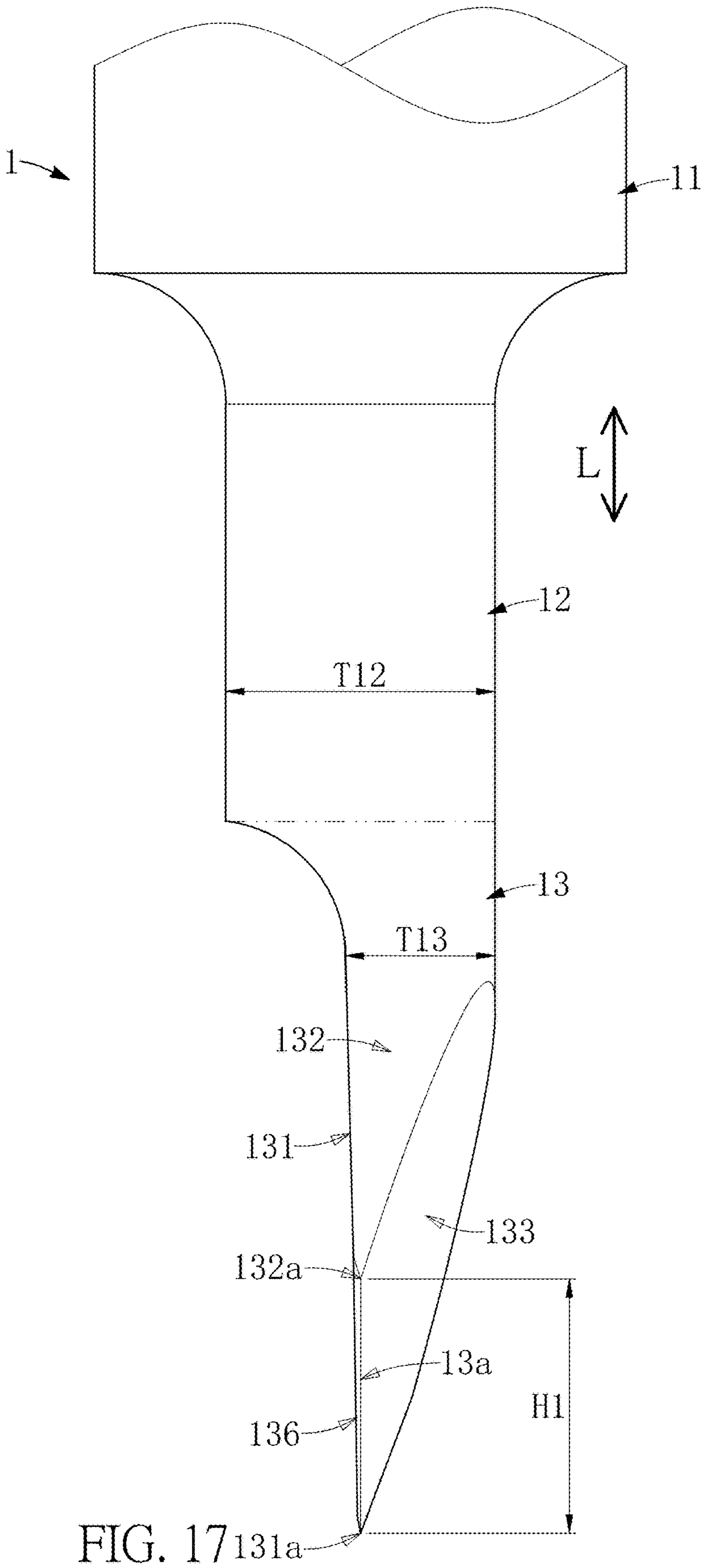
FIG. 17 is a schematic front view of FIG. 15.
Figure 18:
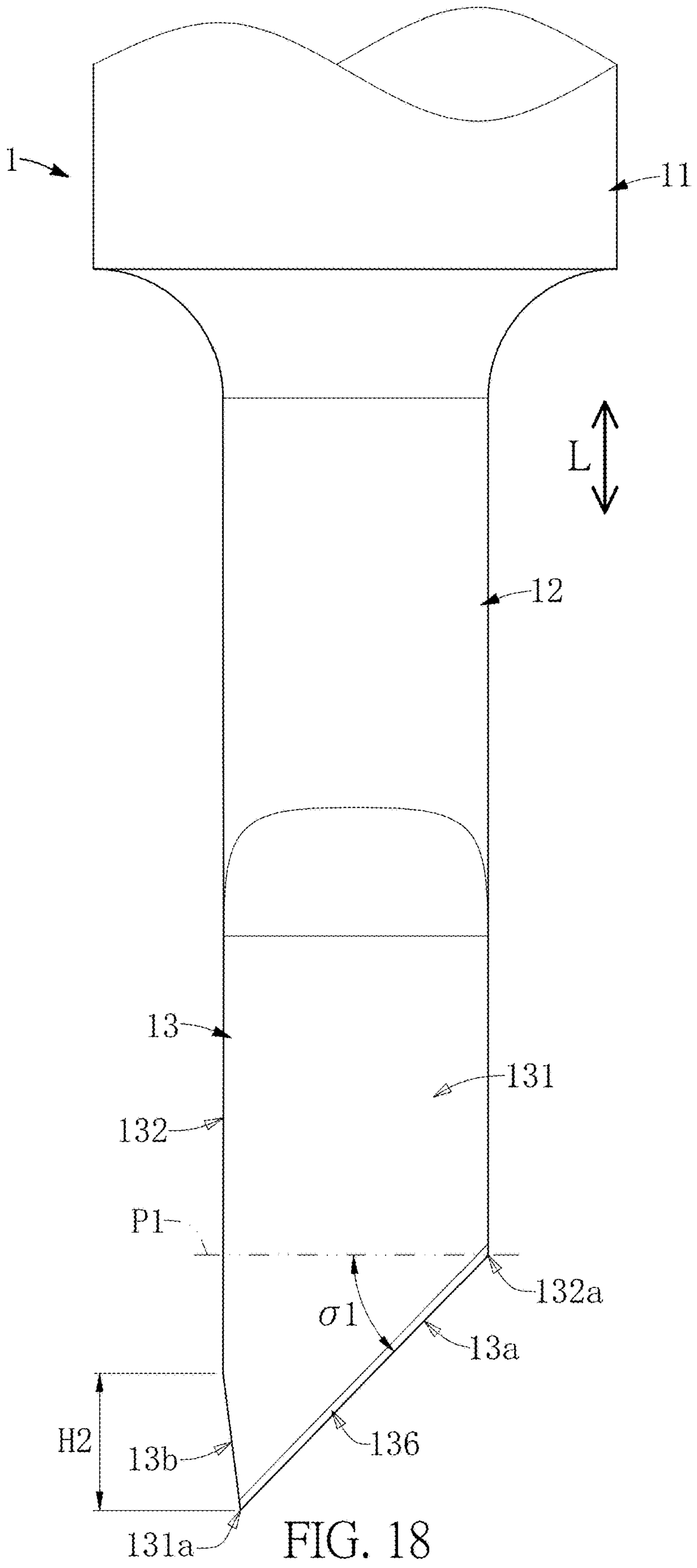
FIG. 18 is a schematic side view of FIG. 15.
Figure 19:
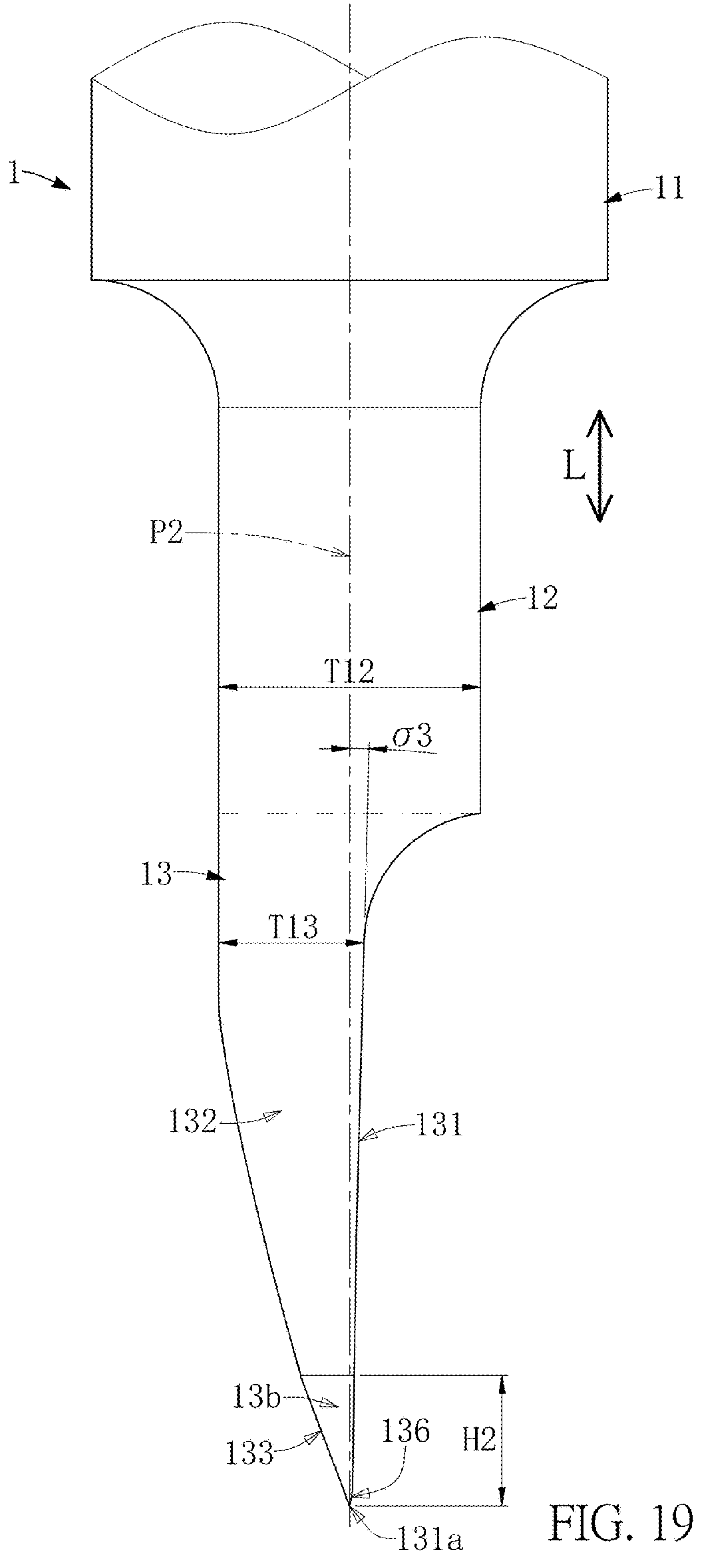
FIG. 19 is a schematic front view of FIG. 16.

Referring to FIG. 14 and FIG. 19, a second embodiment of the present disclosure, which is similar to the first embodiment of the present disclosure, is provided. For the sake of brevity, descriptions of the same components in the first and second embodiments of the present disclosure will be omitted herein, and the following description only discloses different features (e.g., the cutting segment 13 of the cutter 1) between the first and second embodiments.

In the present embodiment, the structure of the cutting segment 13 of the cutter 1 can be adjusted according to design requirements for changing a partial property of the cutter 1 (e.g., a structural strength of the cutter 1) under a condition that the cutting segment 13 can cut the universal sheet 200 having at least 5H hardness. For example, as shown in FIG. 14, the cutting segment 13 of the cutter 1 can be provided without the secondary cutting edge described in the first embodiment according to design requirements.

Moreover, as shown in FIG. 15 to FIG. 19, the supporting segment 12 has a surrounding surface having a circular shape, the first lateral surface 131 is a planar lateral surface 131, and the second lateral surface 132 is a curved (or arced) lateral surface 132 connected to the planar lateral surface 131. In other words, the second lateral surface 132 of the present embodiment is formed in a curved (or arced) shape for replacing the second lateral surface, the first end surface, and the second end surface that are described in the first embodiment. Furthermore, the curved lateral surface 132 is flush with the surrounding surface of the supporting segment 12. The planar lateral surface 131 and the curved lateral surface 132 have a maximum thickness T13 therebetween that is within a range from 40% to 55% of a minimum outer diameter T12 of the supporting segment 12.

Beneficial Effects of the Embodiments

In conclusion, the cutting and attaching system in the present disclosure is operated through the cooperation of the cutting apparatus, the universal sheet, and the film applicator, so that the cutting apparatus can perform the cutting process to the universal sheet having at least 5H hardness according to the film applicator and the mobile apparatus, thereby forming the screen protector that is suitable to be applied to the film applicator and the mobile apparatus and that has no burrs and no scratchy structure. Accordingly, the cutting and attaching system can be used to implement a customized film attaching requirement by cutting the universal sheet until attaching the screen protector onto the mobile apparatus.

Moreover, the cutting and attaching system in the present disclosure is provided with the cutting segment having the specific features (e.g., a scope of the slanting angle, the arrangement of the secondary bevel, the first angle corresponding to the primary cutting edge and being within a range from 43 degrees to 47 degrees, and the first height of the primary cutting edge being within a range from 0.98 mm to 1.08 mm), thereby facilitating the cutting of the universal sheet (or the hardened film) that has at least 5H hardness.

Specifically, in the cutter provided by the present disclosure, the primary cutting edge and the secondary cutting edge are cooperated with each other through the above specific conditions (e.g., the second height of the secondary cutting edge being within a range from 4 μm to 6 μm) thereof, thereby facilitating the cutting of the universal sheet that has at least 5H hardness, effectively preventing the bonding film of the universal sheet from generating burrs, and enabling the universal sheet to have a smooth periphery that is not scratchy after being cut.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A cutting and attaching system for a screen protector having a high hardness, comprising:

a cutting apparatus including:

a carrying machine;

a displacement mechanism being assembled to the carrying machine and being movable relative to the carrying machine;

a processing module assembled to the carrying machine, wherein the processing module is electrically coupled to the displacement mechanism and is configured to move the displacement mechanism along a hole cutting path and a screen cutting path that is different from the hole cutting path, and wherein the screen cutting path corresponds to a contour of a screen of a mobile apparatus; and a cutter assembled to the displacement mechanism, wherein the cutter defines a transversal reference plane and a longitudinal reference plane that is perpendicular to transversal reference plane, the transversal reference plane being perpendicular to a longitudinal direction of the cutter, and wherein the cutter includes:

a supporting segment; and a cutting segment connected to the supporting segment, wherein the cutting segment has a first lateral surface, a second lateral surface corresponding to the first lateral surface, a secondary bevel connected to the first lateral surface, and a primary bevel that is connected to the second lateral surface and the secondary bevel, and wherein a connection edge of the primary bevel and the secondary bevel is defined as a primary cutting edge that is arranged on the longitudinal reference plane;

wherein the first lateral surface and the longitudinal reference plane have a slanting angle therebetween that is within a range from 1 degree to 3 degrees, and the primary cutting edge and the transversal reference plane have a first angle therebetween that is within a range from 43 degrees to 47 degrees, and wherein the primary cutting edge has a first height along the longitudinal direction, the first height being within a range from 0.98 mm to 1.08 mm; and a universal sheet that is configured to be cut to form a screen protector through a cutting process of the cutting apparatus, wherein the universal sheet includes:

a usage layer including a hardened film and a bonding film that is formed on the hardened film, wherein a hardness of the hardened film is at least 5H;

a buffer layer including a first buffer film attached onto the hardened film and a second buffer film that is attached onto the first buffer film, wherein a hardness of the hardened film, a hardness of the first buffer film, and a hardness of the second buffer film sequentially decrease, and wherein a thickness of the hardened film, a thickness of the first buffer film, and a thickness of the second buffer film sequentially decrease; and a bottom layer attached onto the bonding film;

wherein, when the universal sheet is placed on the cutting apparatus under the cutting process, the bottom layer of the universal sheet is fixed to the carrying machine, the displacement mechanism is driven by the processing module to enable the primary cutting edge of the cutter to cut the buffer layer and the usage layer along the hole cutting path for forming a positioning contour that has a plurality of positioning holes, and then along the screen cutting path for forming a screen contour that is located inside of the positioning contour, such that the buffer layer and the usage layer jointly define a screen region and a positioning region that surrounds the screen region and that has the positioning holes; and a film applicator located at a downstream of the cutting apparatus and including:

an accommodating chamber configured to hold the mobile apparatus; and a plurality of positioning pillars arranged on two opposite sides of the accommodating chamber, wherein a relative position of the positioning pillars is identical to a relative position of the positioning holes of the positioning contour, and a relative position between the positioning pillars and the screen of the mobile apparatus is identical to a relative position between the positioning holes and the screen contour;

wherein, when the accommodating chamber of the film applicator holds the mobile apparatus and the positioning holes of the positioning region are respectively sleeved at the positioning pillars, the screen region faces toward the screen of the mobile apparatus for allowing the screen region to be pressed onto the screen.

2. The cutting and attaching system according to claim 1, wherein the primary cutting edge has a tip arranged away from the supporting segment and a top end that is arranged adjacent to the supporting segment, the primary bevel has a bottom side connected to the tip and a top side that is connected to the top end, and the first lateral surface and the second lateral surface are spaced apart from each other, and wherein the cutting segment has:

a first end surface that is connected to the first lateral surface, the second lateral surface, and the bottom side of the primary bevel so as to jointly form the tip; and a second end surface that is connected to the first lateral surface, the second lateral surface, and the top side of the primary bevel so as to jointly form the top end.

3. The cutting and attaching system according to claim 2, wherein the first end surface has a secondary cutting edge that extends from the tip and that has a second height along the longitudinal direction, and wherein the second height is within a range from 4 μm to 6 μm.

4. The cutting and attaching system according to claim 1, wherein the secondary bevel has an elongated shape being parallel to the primary cutting edge, a width of the secondary bevel is within a range from 0.01 mm to 0.03 mm, and an area of the primary bevel is at least 5 times an area of the secondary bevel.

5. The cutting and attaching system according to claim 1, wherein a bottom side of the primary bevel has a height along the longitudinal direction, the height being within a range from 0.73 mm to 0.77 mm, wherein the supporting segment defines a central axis parallel to the longitudinal direction, and a distance between the first lateral surface and the central axis is less than a distance between the second lateral surface and the central axis, and wherein the second lateral surface and the transversal reference plane have a second angle therebetween that is within a range from 91 degrees to 91.5 degrees.

6. The cutting and attaching system according to claim 1, wherein the cutting segment is integrally connected to the supporting segment, the cutter includes an assembling segment, and the supporting segment is soldered onto the assembling segment.

7. The cutting and attaching system according to claim 1, wherein the universal sheet has an identification code arranged on the buffer layer, and the cutting apparatus further includes a scanner that is assembled to the carrying machine and that is electrically coupled to the processing module, wherein the cutting and attaching system includes a cloud server that is electrically coupled to the processing module and the scanner, and wherein, when the universal sheet is fixed onto the carrying machine, the scanner is configured to scan the identification code to generate a signal, such that the cloud server is configured to receive the signal through the processing module for allowing the cutting apparatus to perform the cutting process.

8. The cutting and attaching system according to claim 1, wherein the thickness of the second buffer film is within a range from 75% to 90% of the thickness of the first buffer film, and the thickness of the first buffer film is within a range from 60% to 75% of the thickness of the hardened film.

9. The cutting and attaching system according to claim 1, wherein a sum of the thickness of the first buffer film and the thickness of the second buffer film is within a range from 95% to 105% of a thickness of the bonding film, and the thickness of the hardened film is within a range from 75% to 90% of the thickness of the bonding film.

10. The cutting and attaching system according to claim 1, wherein the supporting segment has a surrounding surface having a circular shape, the first lateral surface is a planar lateral surface, and the second lateral surface is a curved lateral surface that is flush with the surrounding surface of the supporting segment.

* * * * *